United States Patent [19]
Masubuchi

[11] Patent Number: 5,530,817
[45] Date of Patent: Jun. 25, 1996

[54] VERY LARGE INSTRUCTION WORD TYPE COMPUTER FOR PERFORMING A DATA TRANSFER BETWEEN REGISTER FILES THROUGH A SIGNAL LINE PATH

[75] Inventor: Yoshio Masubuchi, Kawasaki, Japan

[73] Assignee: Kabushiki Kaisha Toshiba, Kawasaki, Japan

[21] Appl. No.: 20,836

[22] Filed: Feb. 22, 1993

[30]     Foreign Application Priority Data

Feb. 21, 1992   [JP]   Japan ................... 4-035092

[51] Int. Cl.$^6$ .............................. G06F 9/28; G06F 13/38
[52] U.S. Cl. ................... 395/375; 395/800; 364/228.7; 364/228.9; 364/229.1; 364/230; 364/230.5; 364/231.9; 364/247.8; 364/260.2; 364/262.7; 364/262.8; 364/262.9; 364/931.4; 364/931.41; 364/931.42; 364/DIG. 1; 364/DIG. 2
[58] Field of Search ................... 395/375, 800, 395/310; 364/228.7, 228.9, 229.1, 230, 230.5, 231.9, 247.8, 260.2, 262.7, 262.8, 262.9, 931.4, 931.41, 931.42

[56]               References Cited

U.S. PATENT DOCUMENTS

| | | | |
|---|---|---|---|
| 4,837,730 | 6/1989 | Cook et al. ................... | 395/800 |
| 4,980,819 | 12/1990 | Cushing et al. ................. | 395/375 |
| 5,274,790 | 12/1993 | Suzuki ........................ | 395/460 |
| 5,301,340 | 4/1994 | Cook .......................... | 395/800 |
| 5,307,506 | 4/1994 | Colwell et al. .................. | 395/800 |
| 5,347,639 | 9/1994 | Rechtschaffen et al. ............ | 395/375 |
| 5,442,760 | 8/1995 | Rustad ........................ | 395/375 |
| 5,450,556 | 9/1995 | Slavrnburg et al. ............... | 395/375 |

OTHER PUBLICATIONS

Norman Jouppi, et al., "Available Instruction-Level Parallelism for Superscalar and Superpipelined Machines", Proceedings of third International Conference on Architectural support for Programming Languages and Operating Systems, 1989.

Andrew Wolfe, et al., "A Variable Instruction Stream Extension to the VLIW Architecture", Proceedings of fourth International Conference on Architectural Support for Programming Language and Operating Systems, 1991.

J. Dehnert, et al., "Overlapped Loop support in the Cydra 5", Proceedings of third International Conference on Architectural Support for Programming Languages and Operating Systems, 1989.

Colwell et al, "A VLIW Architecture for a Trace Scheduling Compiler," IEEE, Aug. 1988, pp. 967–979.

Findlay et al, "HARP: A VLIW RISC Processor," IEEE, 1991, pp. 368–372.

Montgomery, "Very Long Words at Very Fast Speeds," Digital Review, vol. 7, No. 2, p. 27(3), Jan. 1990.

*Primary Examiner*—Thomas G. Black
*Assistant Examiner*—Jack M. Choules
*Attorney, Agent, or Firm*—Cushman, Darby & Cushman

[57]               ABSTRACT

Disclosed is a very large instruction word (VLIW) type parallel processing computer architecture. The VLIW is divided into operation field groups which are made up of operands. Each operand in a VLIW is executed by a different processor. The computer contains independent register files for each of the respective operation field groups in a single instruction word. Data transfer between the registers is executed via signal lines which connect registers that are designated as operands in each operation field group to each other. The data transfer between register files is directed by a command which is included as an operand for one of the processors. This command eliminates the need for a destination field in each operand simplifying the VLIW.

11 Claims, 3 Drawing Sheets

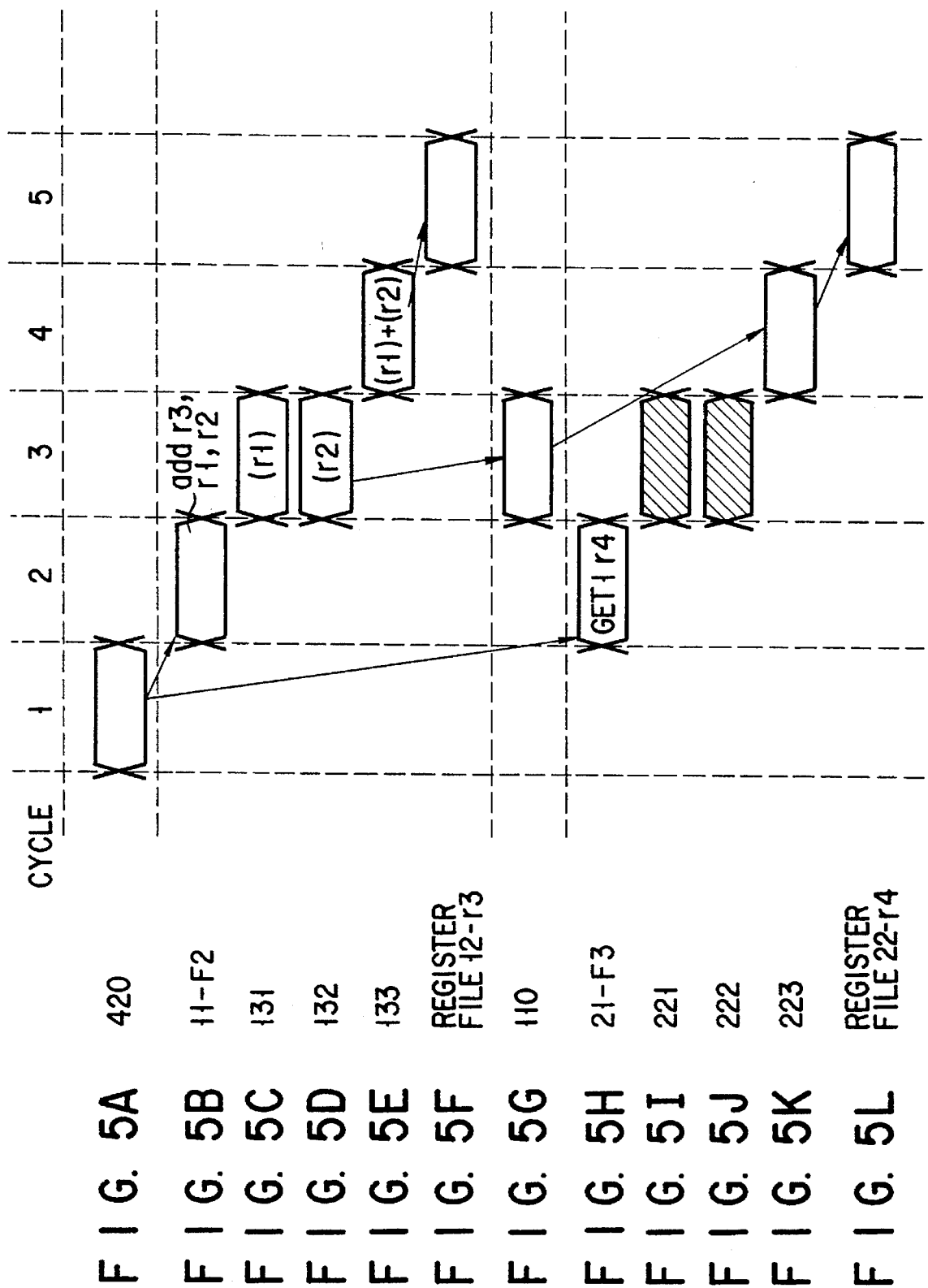

VERY LARGE INSTRUCTION WORD TYPE COMPUTER FOR PERFORMING A DATA TRANSFER BETWEEN REGISTER FILES THROUGH A SIGNAL LINE PATH

BACKGROUND OF THE INVENTION

1. Field of the Invention

The present invention relates to a computer which has a plurality of operation fields in one instruction word and which executes the operation fields in parallel.

2. Description of the Related Art

Heretofore, the instruction system of a computer is designed to execute one operation with one instruction word. It is typical that a sequence of instruction words are read serially word by word so that the functions corresponding to those instruction words may be sequentially performed one by one.

Recently, computers having an improved processing speed have been designed with an instruction system for executing a plurality of operation fields using one instruction word, those operation fields being executed in parallel. Such computers are generally called LIW (Long Instruction Word) type or VLIW (Very Long Instruction Word) type computers. This type of computer has a plurality of arithmetic and logic units to execute the plurality of operation fields in parallel, the system requiring a vast amount of circuits as a consequence. This computer cannot have an architecture of a single LSI chip. Rather it requires a plurality of LSI chips. In particular, when fast devices such as ECLs (Emitter Coupled Logic Circuits) are employed as LSI, the number of LSI chips is increased due to the low integration of the ECL. When a computer has a multi-LSI chip architecture, the transfer rate of signals between chips is slower than the transfer rate within a chip. It is therefore difficult to shorten the total cycle time of the computer.

Even when a computer can be constituted of a single LSI chip, this architecture still requires a vast amount of circuits. It is thus very difficult to design the layout of the individual circuits so as to reduce a signal delay as much as possible.

The aforementioned LIW type and VLIW type computers execute a plurality of operation fields at the same time. Those computers should thus be designed to be able to make multiple accesses to register files that are designated as operands of operations. This requires that multiple access ports be provided for the register files, which inevitably increases the area of the register files occupying an LSI chip. Further, a computer having a pipelining structure needs a circuit to allow the result of an operation to be passed to the upstream of the pipeline. This not only requires an additional area for the bypass circuit but also increases the signal delay time, making it difficult to shorten the processing time.

What is more, many signal lines will concentrate between a plurality of arithmetic logic units and one register file. It is difficult to divide a computer into a plurality of chips without sacrificing the cycle time. Even with a computer having a single-LSI chip architecture, it is difficult to design the layout of a vast amount of circuits in the chip efficiently.

To overcome the above shortcomings, a computer having a plurality of register files has been proposed. In this computer, a plurality of operation fields are associated one to one with a plurality of register files. This design reduces the required connecting lines between the arithmetic logic units and the register files. In addition, each operation field is independent from the other operation fields. This design can reduce the number of required arithmetic and logic units for a single register file, thus decreasing the number of access ports for the register files. Further, if the computer has a pipelining structure, the number of circuits to allow the results of operations to be passed to the upstream of the pipeline would be reduced. The number of lines connecting the register files and arithmetic and logic units is also reduced. It is therefore easy to divide the circuitry with a pair of an arithmetic unit and a register file taken as a unit.

As the computer has a plurality of register files, however, data should be transferred between the register files. If the register files are provided for the respective operation fields, the result of an operation in one operation field is stored in the associated register file. When another operation field needs to refer to the operation result, that operation result should be transferred to the register file which is associated with that operation field which requires the reference. This transfer is accomplished by a data transfer operation between the register files. As this data transfer operation is executed for a plurality of operation fields, the operation provided in whichever operation field should specify the register file associated with the mentioned another operation field. Accordingly, the information of the data transfer operation field should be transferred to the arithmetic and logic unit associated with that another operation field. The independence between the individual operation fields is therefore no longer maintained, making the aforementioned designing of a multi-chip computer difficult. Even with a computer having an architecture of a single LSI chip, it is difficult to efficiently design the layout of a vast amount of individual circuits in the chip.

A general explanation of a VLIW is given in Norman Jouppi, et al., "Available Instruction-Level Parallelism for Superscalar and Superpipelined Machines," Proceedings of Third International Conference on Architectural Support for Programming Languages and Operating Systems, 1989. In other words, this document explains the advantages over an ordinary serial processor and the basic pipelining, though no detailed structures are illustrated.

Further, an example of a VLIW machine having a single register file is disclosed in Andrew Wolf, et al., A Variable Instruction Stream Extension to the VLIW Architecture," Proceedings of Fourth International Conference on Architectural Support for Programming Languages and Operating Systems, 1991. This prior art differs from the present invention in that it has only one register file.

Furthermore, a VLIW machine having a plurality of register files is disclosed in J. Dehnert, et al., "Overlapped Loop Support in the Cydra 5," Proceedings of Third International Conference on Architectural Support for Programming Languages and Operating Systems, 1989. This prior art differs from the present invention in that while the machine has a register file for each arithmetic and logic unit, it is designed so that each instruction field can access a register file associated with another arithmetic and logic unit.

SUMMARY OF THE INVENTION

It is therefore an object of the present invention to provide a high-performance computer which can achieve high independence between a plurality of operation fields in a single instruction word and can permit data transfer between a plurality of register files while ensuring efficient and easy division of the computer into chips or circuit layout in a chip.

To achieve the object, according to the present invention, there is provided a computer having an instruction system including a plurality of operation fields in one instruction word for effecting parallel execution of a plurality of operation fields, comprising a plurality of operation field groups each including at least one of the operation fields; a plurality of register files respectively provided in association with the operation field groups and each designated as an operand only in the associated operation field group; a path connecting that register file which is designated as an operand of one of the plurality of operation field groups to another register file which is designated as an operand of another one of the operation field groups; and data transfer means for transferring data between the register files.

According to this computer, independent register files are provided for the respective operation field groups. Data transfer between the register files is executed via a bus which connects one register file designated as an operand of one of the operation field groups to another register file that is designated as an operand of another operation field group. This eliminates the need for reference to a register file associated with another operation field group in a single instruction word, achieving high independence between the operation field groups. This facilitates the division of the computer into a plurality of chips. Even when the computer is constituted of a single chip, the layout of the individual circuits in the chip can be designed efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 5A through 5L present a timing chart of various types of signals when the instruction shown in FIG. 4 is executed, FIG. 5A showing the timing of data on a signal line 420, FIG. 5B showing the timing of an ALU2 operation field F2 set in a first operation field group buffer 11, FIG. 5C showing the timing of data set in a register 131, FIG. 5D showing the timing of data set in a register 132, FIG. 5E showing the timing of data set in a register 133, FIG. 5F showing the timing of an operand r3 set in a register file 12, FIG. 5G showing the timing of data on a signal line 110, FIG. 5H showing the timing of an LDA operation field F3 set in a second operation field group buffer 21, FIG. 5I showing the timing of data set in a register 221, FIG. 5J showing the timing of data set in a register 222, FIG. 5K showing the timing of data set in a register 223, and FIG. 5L showing the timing of an operand r4 set in a register file 22.

DETAILED DESCRIPTION OF THE PREFERRED EMBODIMENTS

Figure 1:
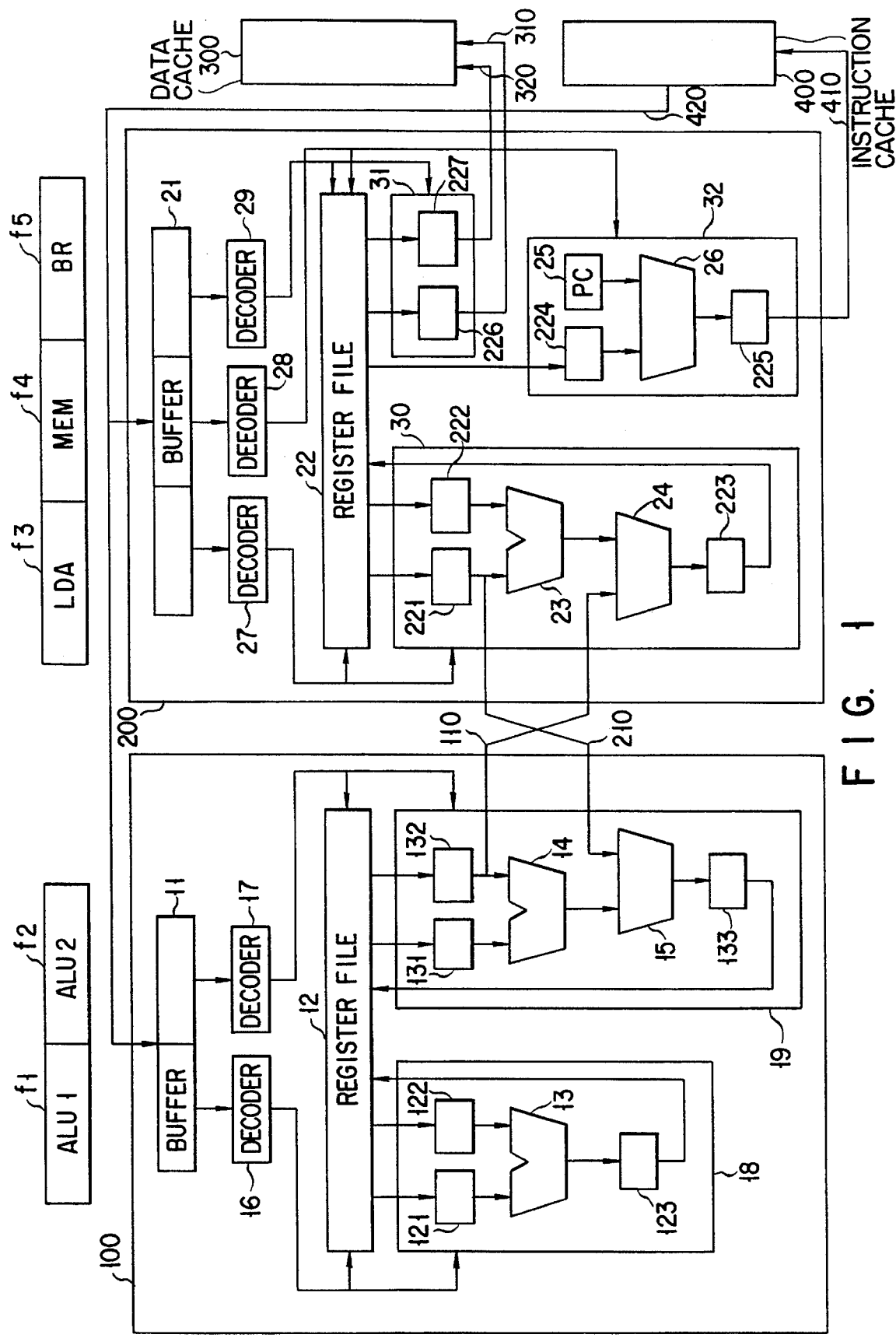
FIG. 1 is a block diagram illustrating a computer which has a plurality of operation fields in one instruction word and executes the operation fields in parallel according to one embodiment of the present invention.

FIG. 1 presents a block diagram showing a computer according to one embodiment of the present invention. This computer is a VLIW type processor, which has an instruction system designed to perform a plurality of operation fields in one instruction word and executes those operations in parallel. This computer comprises a data operation section 100, a memory operation section 200, a data cache 300 and an instruction cache 400. Although the computer further includes a main storage and input/output sections, which are directly related to the present invention and can be accomplished by the well-known schemes, those units will not be discussed below.

Figure 2:
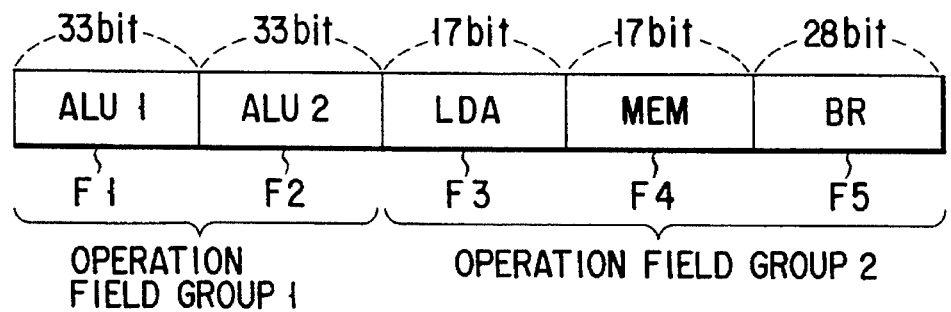
FIG. 2 illustrates the structure of an instruction to be used in the embodiment shown in FIG. 1.

As shown in FIG. 2, an instruction word consists of five operation fields: a first ALU (Arithmetic and Logic Unit) operation field (ALU1 operation field) F1, a second ALU operation field (ALU2 operation field) F2, a data address operation field (LDA operation field) F3, a memory access operation field (MEM operation field) F4 and a branch operation field (BR operation field) F5. This instruction word consists of 128 bits.

The ALU1 operation field F1 and ALU2 operation field F2 constitute a first operation field group, while the LDA operation field F3, MEM operation field F4 and BR operation field F5 constitute a second operation field group. The first operation field group is supplied to the data operation section 100. The second operation field group is supplied to the memory operation section 200.

The data operation section 100 includes a first operation field group buffer 11, a first register file 12, decoders 16 and 17, an ALU1 arithmetic section 18 and an ALU2 arithmetic section 19. The buffer 11 holds the ALU1 operation field F1 and ALU2 operation field F2 in the instruction read from the instruction cache 400, which belong to the first operation field group. The decoders 16 and 17 decode the instruction codes held in the buffer 11. In other words, the decoders 16 and 17 respectively decode the operation fields F1 and F2 (see FIG. 2) to control the ALU1 arithmetic section 18, ALU2 arithmetic section 19 and register file 12. The first register file 12 is designated as an operand of the first operation field group.

The arithmetic sections 18 and 19 execute instructions included in the operation fields F1 and F2, respectively.

The arithmetic section 18 has registers 121 and 122 for registering operand data read from the register file, an arithmetic and logic unit (ALU) 13 for performing an operation on the values held in those registers, and a register 123 for holding the result of the operation. The arithmetic section 19 has registers 131 and 132 for registering operand data read from the register file, an arithmetic and logic unit (ALU) 14 for performing an operation on the values held in those registers, and a register 133 for holding the result of the operation. The arithmetic section 19 further has a selector 15 for selecting either the output of the arithmetic and logic unit 14 or a signal line 210 from the memory operation section 200. The output of the selector 15 is input to the register 133.

The ALUs 13 and 14 execute operations which are designated by the ALU1 operation field F1 and ALU2 operation field F2, respectively. The selector 15 selects either the data signal line 210 from a second register file or the operation result from the ALU 14. It is to be noted that a value of one source register which is specified by the ALU2 operation field F2 is sent onto a signal line 110.

The memory operation section 200 includes a second operation field group buffer 21, a second register file 22, decoders 27, 28 and 29, an LDA arithmetic section 30, a BR arithmetic section 31 and a MEM arithmetic section 32. The buffer 21 holds the LDA operation field F3, MEM operation field F4 and BR operation field F5 in the instruction read from the instruction cache 400, which belong to the second operation field group. The second register file 22 is designed as an operand of the second operation field group.

The decoders 27, 28 and 29 decode the instruction codes held in the buffer 21. In other words, the decoders 27, 28 and 29 respectively decode the operation fields F3, F4 and F5 to control the LDA arithmetic section 30, MEM arithmetic section 32, BR arithmetic section 31 and register file 22.

The LDA arithmetic section 30, which is designed in the same way as the ALU2 arithmetic section 19, executes an instruction included in the operation field F3. The MEM arithmetic section 31 executes an instruction included in the operation field F4. The MEM arithmetic section 31 includes a register 226 for holding a memory address and a register 227 for holding memory data. The BR arithmetic section 32 executes an instruction included in the operation field F5. This BR arithmetic section 32 has a program counter 25, and a register 224 for holding data read from the register file 22.

The LDA arithmetic section 30 further has an arithmetic and logic unit (ALU) 23 for executing an operation that is designated by the LDA operation field F3, and a selector 24 for selecting either the data signal line 110 from the first register file 12 or the operation result the arithmetic unit 23. It is to be noted that the value of one source register of an LDA operation is sent onto the signal line 210.

A register in the register file 22 is read in a memory access operation specified by the MEM operation field F4, and is sent over a data address signal line 310 to the data cache 300. Read data or write data is exchanged between the data cache 300 and the register file 22 over a data signal line 320.

The program counter (PC) 25 holds the address of the instruction that is currently being executed. Normally, the next address to this address is selected by a selector 26 and is sent over an instruction address signal line 410 to the instruction cache 400 to fetch the next instruction. At the time of branching, a PC-oriented branch or jump is executed by address the value of the program counter 25 plus a certain constant or the value of the specified register in the register file 22 in accordance with the designation by the BR operation field F5.

Although a circuit for incrementing the value of the program counter 25 or a circuit for adding a given constant to the count is not illustrated, those circuits can be accomplished by the well-known schemes. The instruction that has been read out is sent over an instruction signal line 420 to the data operation section 100 and memory operation section 200.

Only the selectors 15 and 24 lie in the data transfer path between the register files 12 and 22, so that the delay time is very small as compared with the case where data passes through another arithmetic unit. Even if the data operation section 100 and memory operation section 200 are different chips which are connected by the signal lines 110 and 210, an operation can be executed in the same cycle in parallel with the execution of another operation. That is, the whole computer can easily be divided into a plurality of chips.

Even if the computer is constituted of a single chip, the circuit layout can be designed for each arithmetic section.

An operation of the above embodiment will now be described.

Since an operation using an ordinary ALU, a memory access operation, an LDA operation and a branching operation can be accomplished by the well-known schemes with a restriction that the register files which can be their operands should be those in the operation field groups to which the operations belong, their description will not be given below.

Figure 3:
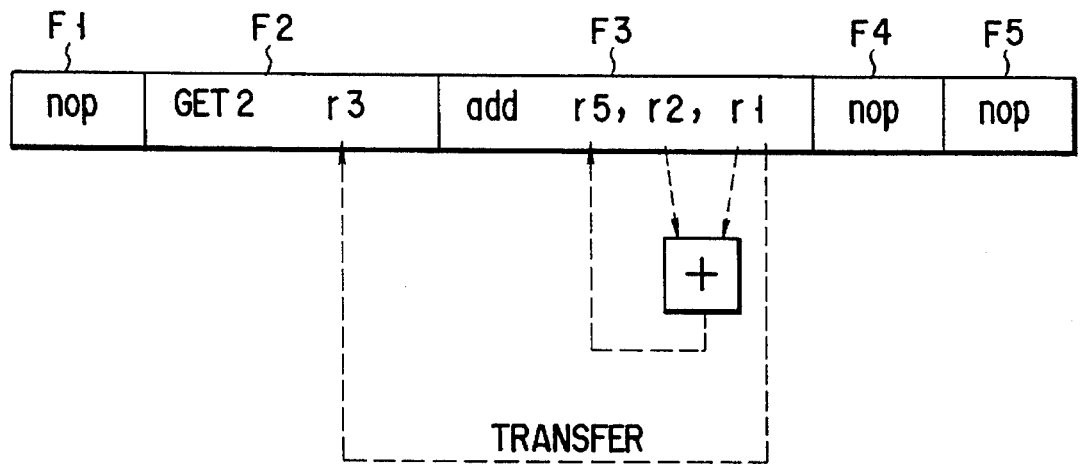
FIG. 3 is a diagram exemplifying data transfer according to the embodiment in FIG. 1.

FIG. 3 illustrates an instruction to transfer the value of a given register (r1) of the register file 22 to a register (r3) of the register file 12. In this example, the data transfer from the register file 22 to the register file 12 is accomplished by the fetching (GET2) of the second register file 22 in the ALU1 operation field F2 and addition (add) in the LDA operation field F3.

In this case, an operation to add the values of a register (r1) and a register (r2) and load the result into a register (r5) is performed in the LDA operation field F3. This operation is executed at the same time when data transfer from the register file 22 to the register file 12 is carried out. Those registers (r1, r2, r5) are located in the second register file 22.

Of the register (r1) and register (r2) serving as a source operand of the LDA operation field F3, the register (r1) is supplied via the signal line 210 to the selector 15 of the data operation section 100. As a result, the register (r1) is transferred to the register file 12 from the register file 22.

In the ALU operation field F2, data transfer (GET2) is executed. This operation is to store the value sent from the second register file 22 into the first register file 12. In this operation, the signal line 210 is selected by the selector 15 and the output value of the selector 15 is loaded into the register (r5 in this case) which is specified as an operand.

In this manner, data transfer from the register file 22 to the register file 12 is performed in parallel with the execution of another operation in the LDA operation field F3. If simultaneously executable operations cannot be designated, an operation having no substantial effect (a dummy instruction) has only to be performed using the source operand that designates the source register (r1) of the data transfer. For instance, the 0-th register should simply be designated as the destination for the operation result in this embodiment because, with such designation, the operation result is thrown away and the operation substantially becomes a null operation (nop).

While nop is designated in the ALU1 operation field F1, MEM operation field F4 and BR operation field F5 in this case, other operations may also be designated. In the LDA operation field F3, data transfer (GET1) is specified. This operation stores the value transferred from the first register file 12 into the second register file 22. The operand of this operation field designates the number of the destination register (r4). The source register (r2) is designated by one of the source operands of the ALU2 operation field F2.

At this time, another operation using this operand can be executed in the ALU2 operation field F2. In the illustrated example, an operation to add the values of the register (r1) and register (r2) in the register file 12 and an operation to store the result in the register (r3) are performed simultaneously. If simultaneously executable operations cannot be designated, a substantial nop operation is to be executed using the source operand to be the source of the data transfer as in the previous case.

Figure 4:
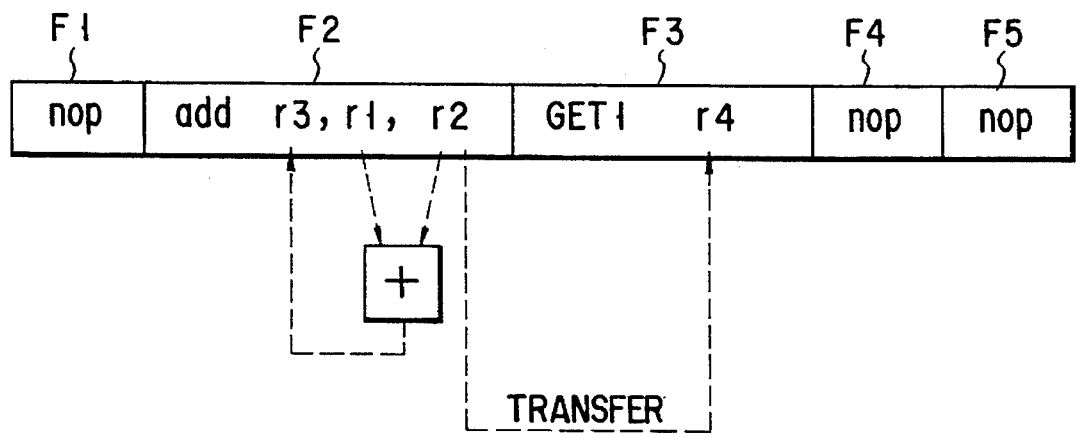
FIG. 4 is a diagram showing another example of data transfer according to the embodiment in FIG. 1.

The instruction shown in FIG. 4 will be described in detail referring to the timing chart given in FIGS. 5A to 5L.

(1) First cycle

At the end of this cycle, an instruction code is fetched into the buffers 11 and 21 over the signal line 420 as shown in FIG. 5A. As shown in FIG. 4, the operation field F2 is "add r3, r1, r2" and the operation field F3 is "GET1 r4."

(2) Second cycle

In this cycle the instructions held in the buffers 11 and 21 are decoded and controls signals associated with the types of the instructions are produced as shown in FIG. 5B. Further, "GET1 r4" is fetched in the buffer 21 (see FIG. 5H).

(3) Third cycle

In this cycle, operand data is read out from the register file 11 and is loaded into the designated register at the end of the cycle. In this case, the values of r1 and r2 in the register file 11 are read and are then loaded into the registers 131 and 132, respectively, as shown in FIGS. 5C and 5D. As the instruction in the operation field F3 has no operand that serves as a source, reading from the register file 11 will not be carried out (FIGS. 5I and 5J).

(4) Fourth cycle

In this cycle, an operation is performed on the values read from the registers. In this example, the values of the registers 131 and 132 are added. The selector 15 is so controlled as to select the signal line 210 in the selector GET instruction, while selecting the output of the ALU 14 in the other instructions. In this case, therefore, the output of the ALU 14 is selected and the operation result is loaded into the register 133 at the end of this cycle.

Meanwhile the value of the register 132 is on the signal line 110 (FIG. 5G). The selector 24, like the selector 15, is so controlled as to select the signal line 110 in the GET instruction and select the output of the ALU 23 in the other instructions. In this example, therefore, the value on the signal line 110 is selected and the content of the register 132 is loaded into the register 223 at the end of this cycle (FIG. 5K).

(5) Fifth cycle

This cycle is to load the register value back to the register file. In this case, the value of the register 133 is loaded back to r3 of the register file 12, and the value of the register 223 back to r4 of the register file 22 (FIGS. 5F and 5L).

In short, according to the present invention, the independent register files 12 and 22 are provided for the respective operation field groups. In addition, data transfer between the register files 12 and 22 is executed via the signal lines 110 and 210 which connect registers that are designated as operands in each operation field group to each other. It is therefore unnecessary to refer to the register file which is associated with another operation field group in a single instruction word, thus ensuring high independence between the operation field groups. The computer can thus be divided into a plurality of chips in association with the individual operation field groups, so that a high-performance computer can be constituted using fast devices.

Further, the present invention can accomplish data transfer between different register files without extending the cycle time. Furthermore, the operand of the transfer source can be made the same as the operand of another operation, thus improving the parallelism of operations and contributing to the improvement of the overall processing efficiency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer for effecting parallel processing, said computer using an instruction system having instruction words, each instruction word having a plurality of operation field groups, each operation field group including at least one operation field, said computer comprising:

a plurality of register files, each respectively provided in association with one of said operation field groups and each designated as an operand only in said associated operation field group; and a path connecting one of said register files which is designated as an operand of one of said operation field groups to another of said register files which is designated as an operand of a different one of said operation field groups, wherein data is transferred between said register files on said path based on an operation in one of said operation fields of said instruction words.

2. The computer according to claim 1, wherein a source operand of said operation invoking a transfer of data is defined by a source operand of another operation that is specified in a register file from which said data is to be transferred.

3. The computer according to claim 1, wherein said register files are each constituted of a single chip.

4. The computer according to claim 1, wherein said plurality of operation field groups have at least a first operation field group consisting of a plurality of ALU (Arithmetic and Logic Unit) operation fields, and a second operation field group consisting of any combination of a data address operation field, a memory access operation field and a branch operation field.

5. The computer according to claim 1, wherein a number of said of operation field groups correspond to a number of said register files.

6. A computer for effecting parallel processing, said computer using an instruction system having instruction words, each instruction word having at least a first operation field group and second operation field group, of said computer comprising:

a first register file being associated with and receiving said first operation field group each time an instruction word is read, said first register file being designated as an operand only in said first operation field group;

a second register file being associated with and receiving said second operation field group each time an instruction word is read, said second register file being designated as an operand only in said second operation field group; and a signal line path connecting said first register file which is designated as an operand of said first operation field group to said second register file which is designated as an operand of said second operation field group, wherein data is transferred between said register files on said signal line path based on an operation in operation fields of said instruction words.

7. The computer according to claim 6, wherein a source operand of said operation invoking a transfer of data is defined by a source operand of another operation that is specified in a register file from which said data is to be transferred.

8. The computer according to claim 6, wherein said register files are each constituted of a single chip.

9. The computer according to claim 6, wherein said first operation field group includes at least one ALU operation field, and said second operation field group includes one or more of a data address operation field, a memory access operation field and a branch operation field.

10. The computer according to claim 6, wherein a number of said operation field groups correspond to a number of said register files.

11. The computer according to claim 6, wherein said first operation field group is different from said second operation field group.

* * * * *